United States Patent [19]

Sasaki et al.

[11] Patent Number: 5,576,975
[45] Date of Patent: Nov. 19, 1996

[54] DISTANCE MEASURING METHOD AND A DISTANCE MEASURING APPARATUS

[75] Inventors: Shigeru Sasaki; Takashi Toriu; Yoshiyuki Ohta; Masaki Watanabe, all of Kawasaki, Japan

[73] Assignee: Fujitsu Limited, Kanagawa, Japan

[21] Appl. No.: 400,526

[22] Filed: Mar. 7, 1995

Related U.S. Application Data

[63] Continuation of Ser. No. 947,839, Sep. 21, 1992, abandoned.

[30] Foreign Application Priority Data

Sep. 20, 1991 [JP] Japan ..................... 3-241289

[51] Int. Cl.$^6$ .................. G01C 3/00; G06G 7/78
[52] U.S. Cl. ............. 364/561; 364/460; 382/106; 356/3; 356/4.01
[58] Field of Search ..................... 364/560, 561, 364/562, 563, 436, 460, 461; 382/1, 106; 340/936, 937, 942; 356/1.4, 28, 28.5, 3, 4.01; 324/160, 161

[56] References Cited

U.S. PATENT DOCUMENTS

| | | | |
|---|---|---|---|
| 3,788,201 | 1/1974 | Abell | 95/1.1 |
| 4,133,606 | 1/1979 | Hosoe et al. | 354/25 |
| 4,135,817 | 1/1979 | Young et al. | 356/28 |
| 4,173,010 | 10/1979 | Hoffmann | 340/936 |
| 4,257,703 | 3/1981 | Goodrich | 356/4 |
| 4,350,884 | 9/1982 | Vollath | 250/204 |
| 4,433,325 | 2/1984 | Tanaka et al. | 340/942 |
| 4,495,589 | 1/1985 | Hirzel | 324/160 |
| 4,671,650 | 6/1987 | Hirzel et al. | 324/160 |
| 4,727,258 | 2/1988 | Tyssen et al. | 250/561 |
| 4,839,824 | 6/1989 | Ando | 364/516 |
| 4,847,772 | 7/1989 | Michalopoulos et al. | 364/436 |
| 4,858,157 | 8/1989 | Murai et al. | 364/560 |
| 4,928,175 | 5/1990 | Haggrén | 364/560 X |
| 4,931,937 | 6/1990 | Kakinami et al. | 364/460 |
| 4,969,735 | 11/1990 | Gilligan | 382/1 |
| 4,984,179 | 1/1991 | Waldren | 364/516 X |
| 5,034,904 | 7/1991 | Moy | 364/516 X |
| 5,066,950 | 11/1991 | Schweitzer et al. | 340/937 |
| 5,159,557 | 10/1992 | Ogawa | 364/460 |
| 5,161,107 | 11/1992 | Mayeaux et al. | 340/937 |
| 5,163,002 | 11/1992 | Kurami | 364/460 |
| 5,165,108 | 11/1992 | Asayama | 340/937 |
| 5,177,462 | 1/1993 | Kajiwara | 340/942 |
| 5,214,408 | 5/1993 | Asayama | 340/937 |
| 5,218,427 | 6/1993 | Koch | 364/561 X |
| 5,307,136 | 4/1994 | Saneyoshi | 356/1 |
| 5,402,118 | 3/1995 | Aoki | 364/436 |
| 5,402,346 | 3/1995 | Lion et al. | 364/436 |

OTHER PUBLICATIONS

"New Automatic Focusing System for Video Cameras," Hideo Toyoda et al., IEEE Transactions on Consumer Electronics, vol. CE–32 No. 3, Aug. 1986, New York, pp. 312–318.

"Robot Vision Sensor," James E. Orrock, Scientific Honeyweller, vol. 5, No. 3, Sep. 1984, Minneapolis, pp. 13–21.

Primary Examiner—Emanuel T. Voeltz
Assistant Examiner—Eric W. Stamber
Attorney, Agent, or Firm—Staas & Halsey

[57] ABSTRACT

Method and apparatus for obtaining distance data from an object to a lens by obtaining an image of the object by an image input unit for forming an image of the object through the lens on an image receiving plane. Two observed images Is and Is' with different blurs from the image input unit are obtained by making a position of the lens and/or a position of the image receiving plane with regard to the object different by a minute distance $\Delta z$. A filtering process is then performed by applying a filter to the two input observed images Is and Is', thereby providing two output images Fs and Fs'. The distance a up to the object is calculated by using the two output images Fs and Fs' obtained by the filtering process based on the relation between the two output images Fs and Fs' and radius s of the blur and the distance a from the lens to the object.

12 Claims, 12 Drawing Sheets

DISTANCE MEASURING METHOD AND A DISTANCE MEASURING APPARATUS

This application is a continuation of application Ser. No. 07/947,839, filed Sep. 21, 1992, now abandoned.

BACKGROUND OF THE INVENTION

The present invention relates to a distance measuring method and a distance measuring apparatus. An input portion of the apparatus of the present invention forms a three dimensional image of an object and processes it, thereby obtaining distance data from the object to the lens. The input unit uses, for example, a television camera to form a two dimensional image of the object through a lens on a image focusing plane. More particularly this distance measuring method and distance measuring apparatus obtains distance data with ease using monocular vision based on two observed images with different blurs provided at positions which are different by a minute distance from each other along the same optical axis.

Several attempts for providing a distance measuring method have been made but a method similar to a human vision system has not been provided. Needs for such a computer vision system are very great in various industries. At present, the distance measuring methods used for an automatic apparatus require complicated techniques and structure. This is especially true when the distance measuring method is used as a computer vision system for an autonomous vehicle. It is necessary for the vehicle to instantaneously and automatically judge its outside situation in order to autonomously operate to a destination and to stop or avoid an obstacle in its way. The distance measuring method to be used for such an application needs to judge instantaneously with accuracy the distance up to an obstacle that has been detected on its path.

However, a method for obtaining complete distance image data has not been available. It is apparent that a visual sensor with distance sensitivity in three dimensional space like a human vision system is required by various industries.

Recently, a method of obtaining distance image data by performing computer processing of an image input from an image input apparatus such as a television camera has been utilized for visual inspection or control in the field of factory automation.

A method of measuring distance up to an object based on a principle of triangular measurement includes an image processing method of searching corresponding points between two input images of binocular vision by using a plurality of television cameras and measuring distances between the television cameras and the corresponding points, and parallax between the corresponding points.

On the other hand, a distance measuring method which does not use image processing, but measures distance up to an object by using a pointing device equipped with a laser has been widely used in the industrial field of public engineering works and architecture. A range sensor and a range finder for obtaining distance data based on two dimensional images by using laser scanning have been on the market.

The former method using image processing searches corresponding picture elements in each image based on a calculation by using an image input from at least two television cameras. For this method of utilizing a stereo view, a relative method or a dynamic programming method has been proposed for searching corresponding points.

However, although this method can recognize a situation in three dimensional space, this method requires a large amount of data as it scans the whole screen and, therefore, takes time to calculate distance data. This method especially takes much time to obtain the distance of a part such as at an edge at which the light and shade variation of the image is large and is easily affected by noise, thereby being unable to obtain complete distance image data.

The latter method not using image processing can extract two dimensional distance data but has the defects in that a high resolution of data is difficult and that it takes time to obtain three dimensional distance data.

SUMMARY OF THE INVENTION

The present invention aims at obtaining image data by processing input images from an image input unit and at calculating distance data based on two different observed images along the same optical axis with different blur by using monocular vision.

The present invention applies respective filters (Gabor function) to two input observed images Is and Is' with different blurs and obtains respective output images Fs and Fs' for respective predetermined frequencies k in a frequency range. The present invention utilizes an expression representing a relation between the output images Fs and Fs' and their radius s of blur and an expression representing a relation between a radius s of the blur and distance a from a lens to an object and substitutes numerical values into the respective variables of the expressions. Further, the present invention refers to a look-up-table between the observed quantity and the distance up to the object, the table being previously prepared through an experimental calibration. Thus the present invention can calculate the distance data up to the object.

BRIEF DESCRIPTION OF THE DRAWINGS

One skilled in the art can easily understand additional features and objects of this invention from the description of the preferred embodiments and some of the attached drawings. In the drawings.

DETAILED DESCRIPTION OF THE PREFERRED EMBODIMENTS

First, the principle of distance measurement according to the present invention will be explained.

Figure 1:
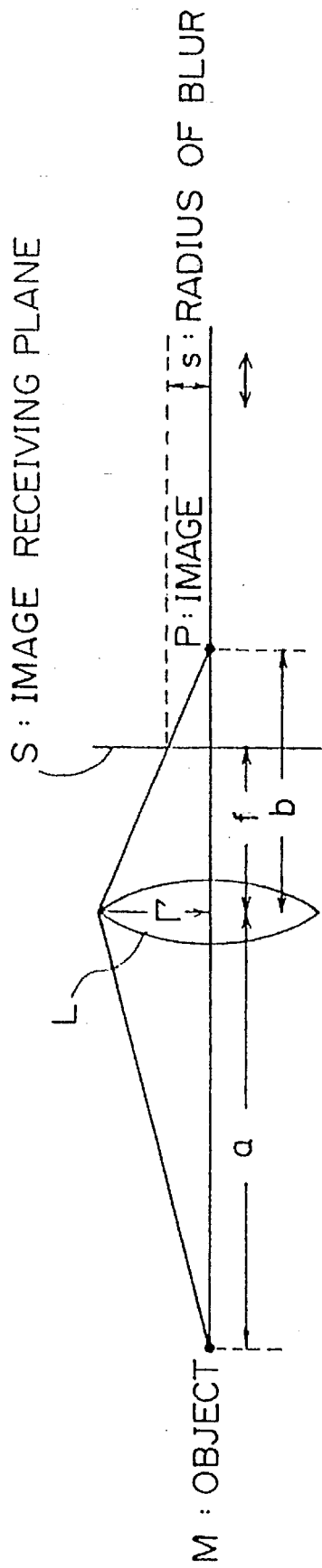
FIG. 1 shows a basic optical system using the principle of the distance measuring method according to the present invention.

FIG. 1 shows the principle of the present invention wherein the in-focus distance of lens L:f, the radius of lens L:Γ, the distance from the center of lens L up to the object M:a and the distance from the center of lens L to an image P:b. A lens formula is provided as follows:

$$1/a + 1/b = 1/f \tag{1}$$

Therefore, the object M located at a preceding position with distance a from the center of lens L focuses its image P at a succeeding position with a distance $b = af/(a-f)$ from the center of lens L. The distance from the lens L to the object is to be determined. For example, when a focus of a television camera is matched with an infinity point, either the lens L or the image receiving plane S is moved. Then, the image of the object located at the succeeding position with distance a from the center of the lens provides the following blur:

$$\Gamma(b-f)/b = \Gamma f/a \tag{2}$$

The radius s of the blur is provided based on the geometrical resemblance relation as follows.

$$s = \Gamma f/a \tag{3}$$

The radius s of the blur is defined as a radius s on the image receiving plane S when the object, namely, a point light source, is located at distance a from the center of the lens L.

For the sake of simplicity, a one dimensional image located on the optical axis is assumed. In this case, the x axis and y axis are located on the image receiving plane S and the z axis is in the direction of the optical axis, thereby providing three dimensional coordinates. Where an image which is in focus (unknown image):$I_0(x)$ and an image which is out of focus with blur of radius s (of an observed image):$I_s(x)$, an image with blur can be obtained by applying a filtering process to the image which is in focus.

$$Is(x) = \int p(x-x') I_o(x') dx' \tag{4}$$

The function p (x–x') represented by the following expression is a filter function.

$$p(x - x') = 1/2s \quad \text{if } |x - x'| \leq s \tag{5}$$
$$= 0 \quad \text{if } |x - x'| > s$$

The filter function corresponds to a blur filter, it gives a value of 0 outside the diameter 2s of the blur and gives the value of the function inside the diameter 2s of the blur. If the inverse transformation is performed in the expression (4), an image in focus can be obtained from an image with a blur.

Therefore, a space filter operation (Gabor function) is applied to the observed image Is (x). Namely, a filtering process is applied to the blurred image, thereby eliminating blur to provide the image which is in focus.

$$Fs = \int \exp(-x^2/\sigma^2) \exp(ikx) Is(x) dx \tag{6}$$

Where $\exp(-x^2/\sigma^2)$ represents a Gaussian function and $\exp(ikx)$ represents a kernel of a Fourier transformation. This expression (6) represents a Gaussian filter applied to the observed image Is, thereby performing a Fourier transformation. k represents a predetermined frequency and Fs represents an output when the center of the filter is positioned at the origin of the coordinates formed by x, y, and z axes. Namely, the output Fs is the data obtained by performing a Fourier transformation of the image for the corresponding predetermined frequency k with regard to the both sides of the origin of the coordinates when the optical axis is provided through the origin.

The following expression is obtained from expression (4).

$$Fs = \iint \exp(-x^2/\sigma^2) \exp(ikx) p(x-x') I_o(x') dx dx' \tag{7}$$

An integral operation is performed with regard to x.

$$\int \exp(-x^2/\sigma^2) \exp(ikx) p(x - x') dx = \tag{8}$$

$$(1/2s) \int_{x'-s}^{x'+s} \exp(-x^2/\sigma^2) \exp(ikx) dx \quad \sigma \gg s \approx$$

$$(1/2s) \exp(-x'^2/\sigma^2) \int_{x'-s}^{x'+s} \exp(ikx) dx =$$

$$(1/2s) \exp(-x'^2/\sigma^2) 2 \sin(ks) \exp(ikx')/k =$$

$$(\sin(ks)/ks) \exp(-x'^2/\sigma^2) \exp(ikx')$$

Therefore, the following expression is obtained:

$$Fs = (\sin(ks)/ks) \int \exp(-x'^2/\sigma^2) \exp(ikx') I_o(x') dx' \tag{9}$$

Next, the television camera is moved toward the object M by ΔZ along the optical axis, thereby taking a photograph of an observed image Is' (x). Then, the radius of the blur is changed to s' and is expressed by the following expression.

$$s' = \Gamma f/(a - \Delta z) \approx (\Gamma f/a)(1 + \Delta z/a) = s + \Delta z/a = s + s^2 \Delta z/\Gamma f \tag{10}$$

When the same filter is applied to the second observed image Is'(x), the following expression (11) is obtained in the same manner as in expression (9).

$$Fs' = (\sin(ks')/ks') \int \exp(-x'^2/\sigma^2) \exp(ikx') I_o(x') dx' \tag{11}$$

In order to delete the integral term including the unknown quantity, the expression (9) is subtracted from expression (11) and is further divided by expression (9).

$$(Fs' - Fs)/Fs = \frac{\sin(ks')/ks' - \sin(ks)/ks}{\sin(ks)/ks} \tag{12}$$

The left side of expression (12) represents a definition of a differential equation, assuming that:

$$ks' - ks = ks^2 \Delta z / \Gamma f \ll 1 \quad (13)$$

Namely, the amount of the movement of the camera is made sufficiently small. Both sides of expression (12) are divided by $\Delta z$, thus providing expression (14):

$$\frac{(Fs' - Fs)}{(\Delta z)Fs} = \frac{ks \cos(ks) - \sin(ks)}{\sin(ks)} \cdot \frac{s}{f\Gamma} \quad (14)$$

The expression (14) represents a relation between the observed quantity (the left side of expression (14)) and the radius s of the blur. In expression (14), k is a predetermined frequency, namely, a constant number, f and $\Gamma$ are known, and Fs, Fs' and $\Delta z$ are values obtained by processing an image when the camera is moved.

When the television camera is moved along the optical axis, images at two points are input to the television camera and a filtering process represented by expression (6) is applied to the respective images. A calculation of expression (14) is also performed, thereby obtaining the radius s of the blur. When the expression (3) is substituted into the expression (14), the expression representing the relation between the observed quantity (the left side of the expression) and the distance a up to the object is derived. The respective numerical values of Fs, Fs', $\Delta z$, k, f, and $\Gamma$ are substituted into the expression and the calculation is performed. Thus, the distance a up to the object is obtained by the calculation.

As is explained above, a distance a can be obtained by carrying out a calculation using the expression which represents the relation between the observed quantity (the left side) and the distance a up to the object and is obtained by manipulating expression (14). The distance a can be also obtained by referring to a look-up-table. The look-up-table is previously prepared for corresponding predetermined frequencies k with regard to the calculation value of the left side of the expression (14) and the distance a up to the object which is actually measured upon an operation of the calculation. The look-up-table is referred to using the input of discretionary image data, thereby obtaining as output the distance a from the input value obtained by calculating the observed quantity on the left side of expression (14).

Figure 2:
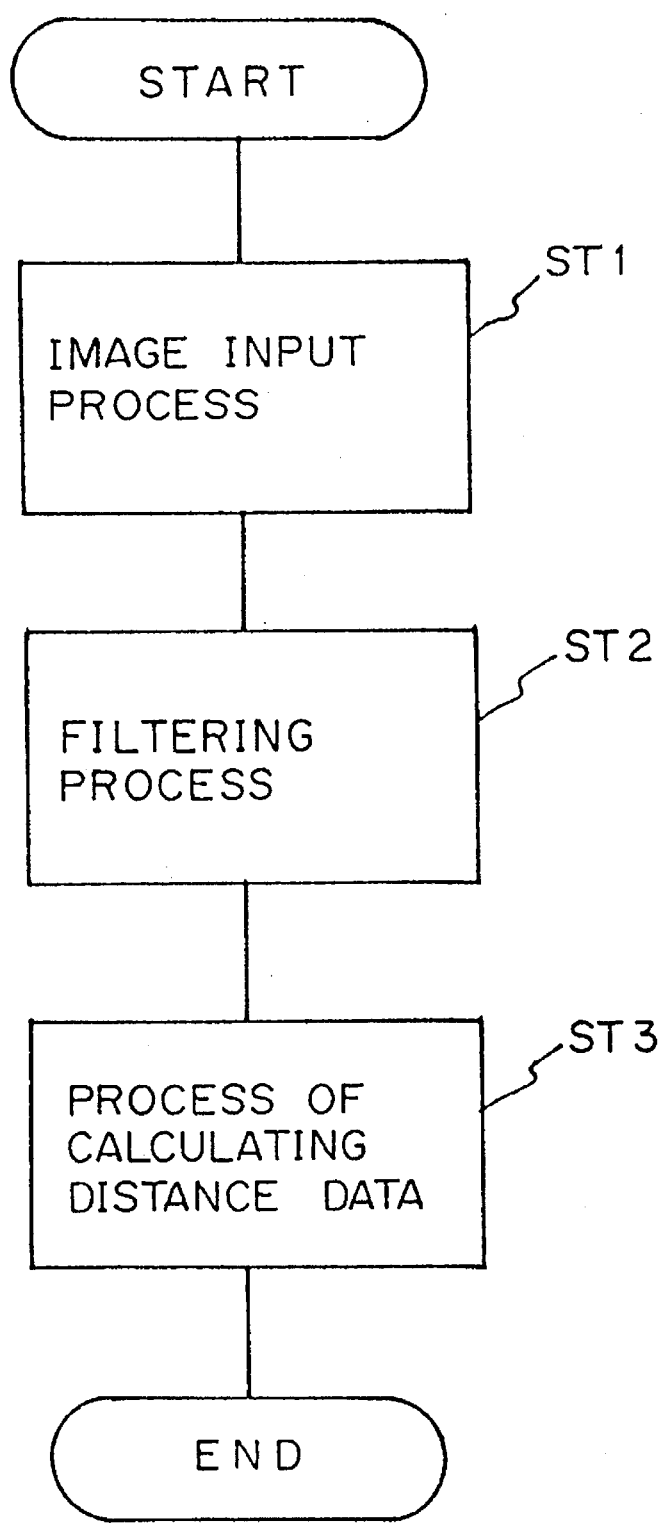
FIG. 2 shows a flowchart of the principle of the distance measuring method according to the present invention.

The distance measuring method of the present invention comprises the following processes. FIG. 2 shows a flowchart of the principle of operation of the present invention.

Step ST1 shows an image input process of receiving two observed images Is and Is' having different quantities of blur from the image input unit by changing the position of the lens, the position of the image receiving plane or the positions of both the lens and the image receiving plane by a minute distance $\Delta z$ from the object on the same axis.

Step ST2 shows filtering process for obtaining two output images Fs and Fs' by applying the filtering process shown in expressions (6) and (7) to the input observed images Is and Is'.

Step ST3 shows a process of calculating distance data for obtaining the distance a up to the object by using two output images obtained by the filtering process based on the expression (3) representing the relation between the radius s of the blur and the distance a from the lens up to the object.

When the distance measuring method of the present invention starts, the process carries out step ST1 for inputting from the image input unit 6 two observed images which are obtained at positions different from each other by a minute distance on the same optical axis and have different quantities of blur.

The process carries out filtering step ST2 for applying a Gabor function to two input observed images and for obtaining two output images in focus with regard to the predetermined frequency. The step ST2 is performed by referring to the calculation shown by the expression (6).

Next, the process carries out step ST3 for calculating the distance data based on the expression representing the relation between the observed quantity and the distance a up to the object, the expression being obtained by substituting the expression (3) into the expression (14) and by substituting respective numerical values to the expression. The distance data can be also obtained by referring to a previously prepared look-up-table between the observed quantity and the distance a to the object with regard to the predetermined frequency k. Therefore, the distance data is calculated by using the expression based on the two output image out of focus which are obtained by the above filtering step ST2.

As described above, the distance measurement operation can be performed at high speed effectively and easily by using monocular vision.

Figure 3:
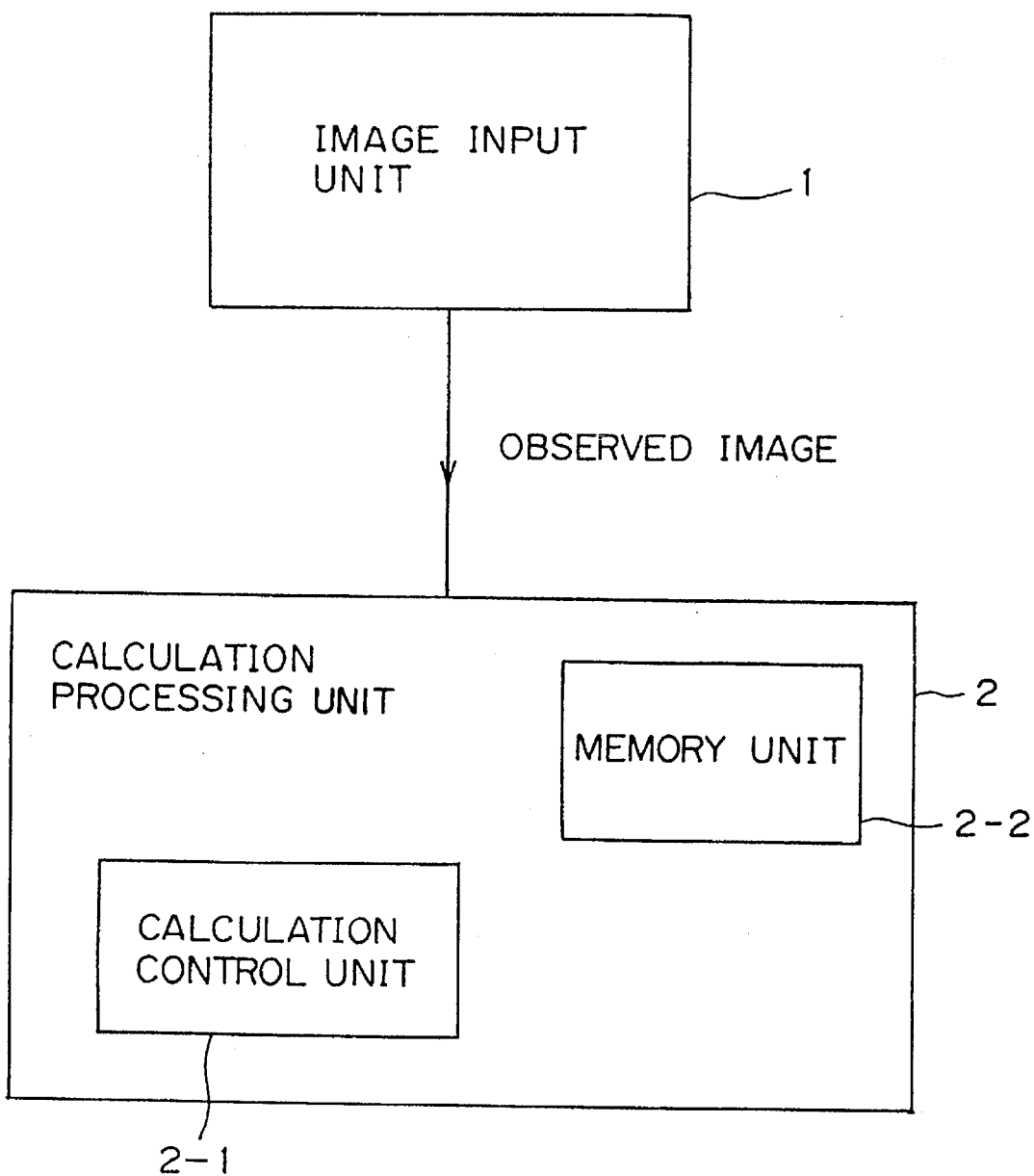
FIG. 3 shows a block diagram of the principle of the present invention.

FIG. 3 shows a principle configuration of the present invention. The image input unit 1 includes a lens and a physical image receiving plane. An observed image of the object is obtained on the physical image receiving plane through a lens thereby outputting the observed image.

The calculation processing unit 2 includes the calculation control unit 2-1 and a memory unit 2-2 and performs a calculation of an output image from the observed image input from the image input unit 1 using expression (6) and (7) and obtains the distance a up to the object from the output image using expressions (14) and (3).

When the image input unit 1 outputs an analog signal, the calculation processing unit 2 able to deal with an analog signal and thus the calculation control unit 2-1 and memory unit 2-2 processes or memorizes the analog signal. When an A/D converter is provided between the image input unit 1 and the calculation processing unit 2, the calculation processing unit 2 can deal with the digital signal.

Expressions (6) and (7) represent basic expressions for providing the digital signals. The physical meaning and the possible expansion of expressions (6) and (7) will be explained as follows.

Expressions (6) and (7) represent the Gabor function for the input signal Is (x) and Is' (x). A Gaussian function is obtained for an input signal, including a center of information of a field and a weight according to a Gaussian distribution is applied to the input signal. A Fourier transformation is applied to the field with regard to a frequency k in a positive or negative direction of the center of the information of the field.

In the video signal, the information of the field is generally two dimensional. In the present invention, however, a distance from an object to the image receiving apparatus (camera) is obtained by using only one dimension of information along a direct line in a direction perpendicular to the direction of the distance (i.e. the z axis), namely, in the directions of the x axis and y axis. In the present embodiment, the distance is obtained by using only information in the direction of the x axis, but the information in the direction of the y axis may be also used. Further, the information in the direction of both the x axis and the y axis may be used to obtain the Gabor function and the information with a larger signal energy may be utilized.

$\sigma$ is a parameter for representing a function of a weighting operation, namely a distribution function for providing the size of a filter. $\sigma$ is determined such that a calculation for obtaining a limit of the image size is used for obtaining the distance. Especially, when a predetermined image element is considered, an inter-relation is strong in the vicinity of the image element and becomes weak in a location remote from the image element. Therefore $\sigma$ is controlled such that the process is performed by considering only the vicinity of the image element.

σ may be infinity (∞), and in this case a calculation is conducted under the assumption that exp $(-x^2/\sigma^2)=1$. Specifically the calculation is conducted with the weight made constant.

Figure 4:
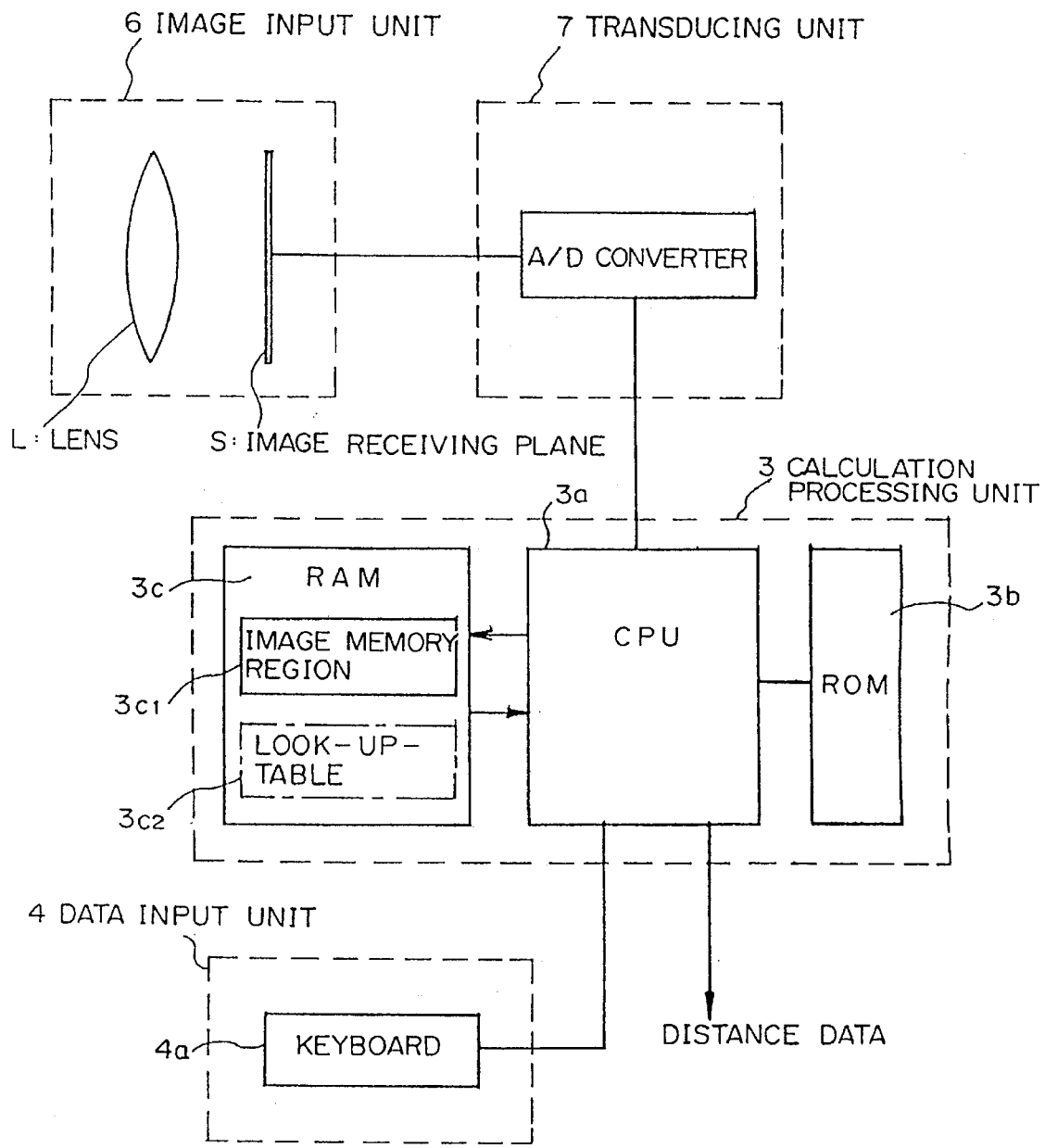
FIG. 4 shows a block diagram of the structure of a first embodiment of a distance measuring apparatus according to the present invention.

FIG. 4 shows a block diagram of a schematic structure of the distance measuring apparatus for carrying out the distance measuring operation of the present invention. The distance measuring apparatus obtains the distance data by using monocular vision based on the detailed description above. The symbols and codes used for the explanation of the principle in FIG. 1 are also used in the following explanation for the same parts and the same contents.

In FIG. 4, the image input unit 6 comprises a television camera including lens L and image receiving plane S, for example. The observed image Is of the object, measured and with a blur at a certain position on the same optical axis, and the observed image Is' at a position moved from the certain position by a minute distance $\Delta z$, are provided through the lens L on the image taking plane S.

Two observed images Is and Is' have blurs whose quantities are different. The two observed images obtained on the image receiving plane S are converted to digital form through a transducing unit 7 comprising A/D converter, for example, thereby being output to the calculation processing unit 3.

The calculation processing unit 3 comprises well-known elements CPU3a, ROM3b and RAM3c. A program for controlling the CPU3a is written into ROM3b. The CPU3a receives necessary data from the observed image input unit 6 in accordance with the program stored in ROM3b and performs a calculation process by exchanging the data between CPU3a and RAM3c. CPU3a stores the result of the processing, namely, the distance data, in RAM3c, if necessary, or outputs the result to an external device. CPU3a performs the following operation in accordance with the capacity of the system.

When the processing speed of CPU3a is higher than the conversion speed of the A/D converter provided in the transducing unit 7, the resulting data obtained by the A/D conversion is stored in the image memory region $3c_1$ of RAM3c sequentially in units of an image element and the above described calculation is performed, thereby providing Fs and Fs'. Then it obtains the distance based on the values of Fs, Fs' and $\Delta z$ is obtained.

When the processing speed of CPU3a is slower than the conversion speed of the A/D converter provided in the transducing unit 7, the data resulting from the A/D converter is stored in the image memory region $3c_1$ in RAM3c sequentially in units of image element. For example, when the data transmission speed of CPU3a is further slowed and CPU3a cannot store the data in RAM3c, the DMAC may be provided. Thereafter, Fs and Fs' are obtained as previously. The distance a can be obtained by using these values Fs, Fs' and $\Delta z$.

The case of the high processing speed of the CPU will be explained as follows. CPU3a performs the calculation represented by expression (6) with regard to the observed image input from the image input unit 6 and obtains the output images Fs and Fs', thereby storing them in image memory $3c_1$ in RAM3c.

Further, CPU3a substitute the respective numerical value of the predetermined frequency k, the focus distance f of lens L and the radius Γ of lens L and the minute movement quantity $\Delta z$ of the camera and the output images Fs and Fs' into expression (14) representing the relation between the above distance images Fs and Fs' and the blur radius s and expression (3) representing the blur radius s and the distance a from the lens L to the object. The CPU3a calculates the distance a up to the object based on the expression representing the relation between the observed quantity and the distance a which is obtained from expressions (14) and (3). Then it stores the distance data in RAM3c and further outputs it to the external device.

The distance data is obtained from the look-up-table, representing the relation between the value obtained by calculating the left side of the expression (14) using the values (Fs, Fs' and $\Delta z$) obtained from the observation, and the value obtained by an actual measurement of the distance up to the object.

The distance data is obtained by using the look-up-table $3c_2$ which is stored in RAM3c. CPU3a calculates the left side of expression (14) from the value of the output image Fs and Fs' obtained by applying the calculation to the discretionary observed images Is and Is' and the value of the minute movement quantity $\Delta z$ and obtains the distance data by referring to the look-up-table based on these values.

Figure 5:
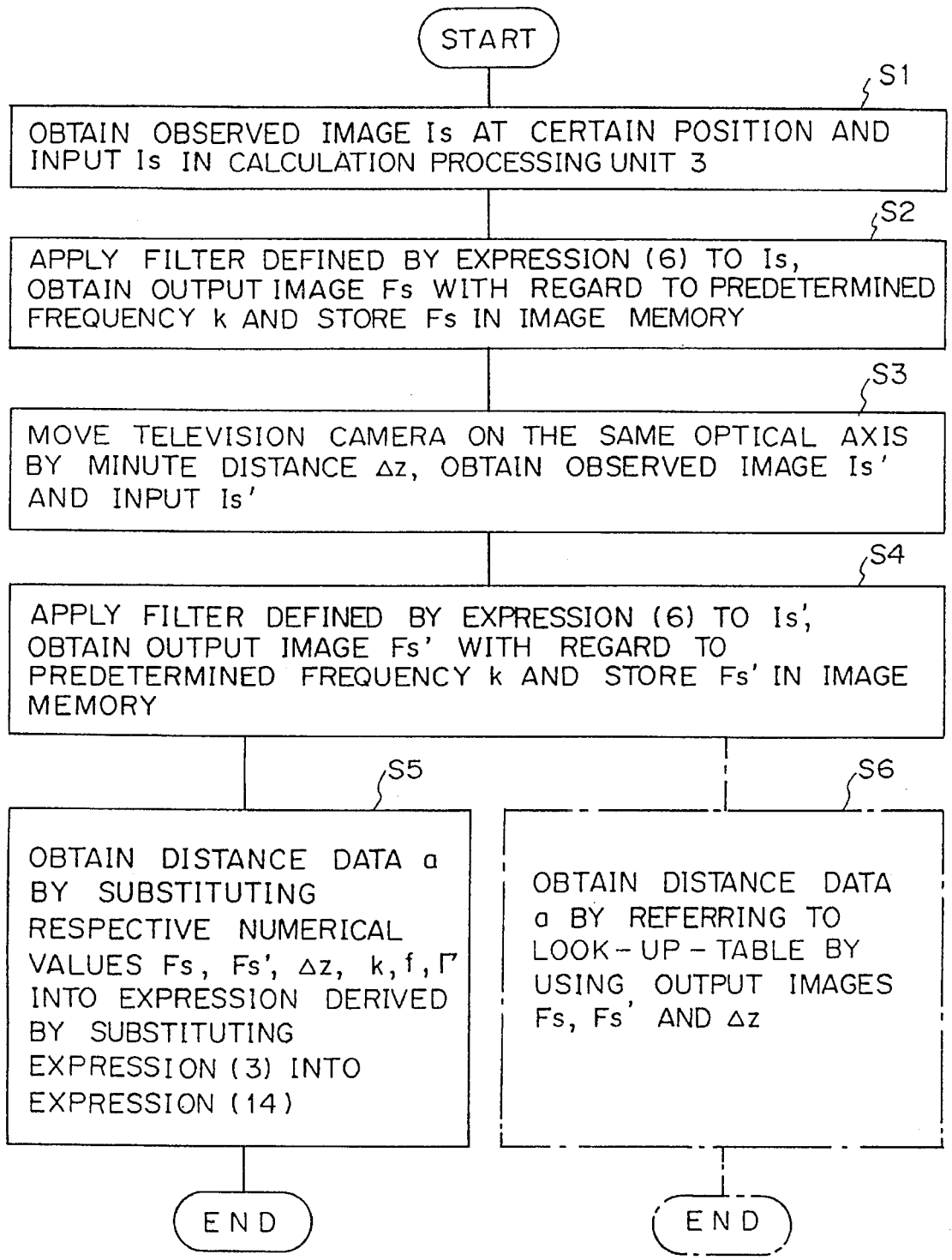
FIG. 5 shows a general flowchart of the process of measuring distance according to the present invention.

FIG. 5 shows a general flowchart of the process of the distance measuring method of the present invention which is performed by CPU3a in the distance measuring apparatus shown in FIG. 4. The concrete operation of the distance measuring apparatus will be explained as follows.

First, the process performs step S1 for obtaining the observed image Is of the object M at a certain position on the optical axis on the image receiving plane S through lens L by using the image input unit 6 such as a television camera and for inputting the observed image Is in the operation process unit 3 via the transducing unit 7. The observed image Is with a blur having a radius s is obtained by applying a blur filter to the image Io in focus and is represented by expression (4). Conversely, expression (4) determines the condition of the blur filter p(x–x'), namely, determines that the observed image can be obtained on the optical axis, thereby performing an inverse conversion. Then, the image Io in focus is obtained from the observed image Is.

Next, the process performs step S2 for applying the filter (Gabor function) defined by expression (6) to the observed image Is, obtaining the output image Fs with regard to the predetermined frequency k and for storing the output image Fs in the image memory $3c_1$ in RAM 3c.

The image output Fs is represented by the expression (6) as described above and the output is obtained when the center of the filter is matched with the origin of the filter.

Further, the process performs step S3 for moving the television camera on the same optical axis by a minute distance $\Delta z$ and for obtaining the observed image Is' at a position apart from the original position by the minute distance $\Delta z$, thereby receiving the observed image Is'. The observed image Is' is the image with the blur whose radius is changed from s to s', and which is different from that of the image observed Is.

Then the process performs step S4 for applying the filter, (Gabor function) to the observed image Is' as in step S2 and for obtaining the output image Fs' for the predetermined frequency k and storing it in the image memory $3c_1$ in RAM3c. Thus, the image output Fs' can be represented by expression (11).

Next, when the distance data a relating to the distance up to the object is calculated, the process advances to step S5. The process substitutes respective numerical values of the output image Fs and Fs', minute movement quantity $\Delta z$, a focus distance f of lens L, predetermined frequency k and radius Γ of lens L into the expression derived by substituting the expression (3) into expression (14), namely, the expression giving the relation between the quantity obtained by the observed and the distance up to the object.

On the other hand, when the distance data up to the object is obtained by referring to the look-up-table, step S4 advances to step S6. The process refers to the look-up-table using the output image Fs and Fs' of the left side of expression (14) and the numerical value of the minute movement quantity Δz and the actual distance data a up to the object.

A method of preparing the look-up-table used in step S6 through a calculation or a method of preparing the look-up-table used in step S6 by using an actual experimental calibration are considered. Either method provide the distance data relating to the distance a up to the object.

The experimental calibration is used in the conventional distance measuring method of utilizing stereo vision, as the optical members such as the lens of the camera have different properties and thus are not intrinsic to the present invention.

As described above, in the present embodiment, the observed image obtained at a given position and the observed image obtained at a small distance from the given position on the same optical axis have different blur quantities at the same point on the image receiving plane. The filter (Gabor function) designated by expression (6) is applied to two input observed images with different blurs. Further, respective output images are obtained for the predetermined frequencies in a frequency range and the expression (14) relating to the relation between the observed quantity and the radius of the blur is obtained. The process calculates the data relating to the distance up to the object by using a method of calculating the distance by substituting respective values in expressions (14) and (3) or by referring to the previously prepared look-up-table between the observed quantity and the distance up to the object.

Figure 6:
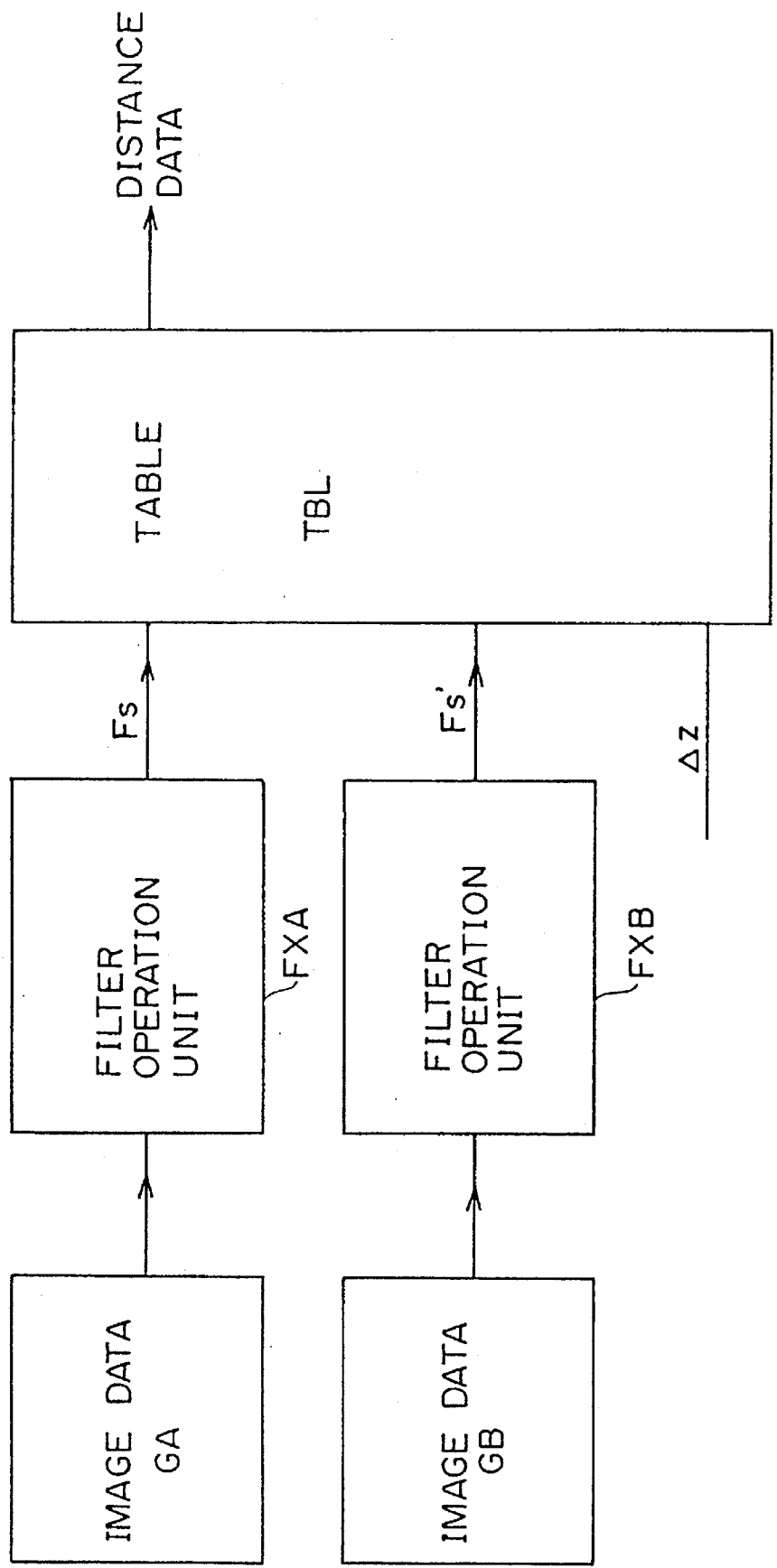
FIG. 6 shows a configuration of a block diagram of a second embodiment using a look-up-table defined by the present invention.

FIG. 6 shows a configuration of the second embodiment of the present invention in which the look-up-table is used. The relation between the observed value of the left side of the expression (6) for corresponding predetermined frequencies k and the actual value is measured upon an execution of the calibration and is stored in the look-up-table. Then, when the discretional image data is input, the look-up-table obtained by calculating the left side of the expression based on the results Fs and Fs' of the filtering and the movement quantity Δz is referred to, thereby providing the distance data. Namely, as shown in FIG. 6, the image data GA and GB are input to the filter operation units FXA and FXB, thereby providing the output Fs and Fs'. The filter operation units FXA and FXB comprise the same circuit but their input are different. As a result, the input data is stored in the table by using the Fs and Fs' and the distance Δz, by which the lens or camera are moved upon inputting these image data as the address of the table. Therefore, the table TBL outputs the distance data representing the actual distance previously obtained upon an execution of the calibration.

This embodiment does not require large quantities of calculations for finding the corresponding points between images input two television cameras which are required by the conventional distance measuring method of using stereo vision and thus measures the distance better than a human being, who makes defective measurements. It performs rapidly with a simple construction using monocular vision.

The above embodiment was described using a one dimensional image on an optical axis. Three dimensioned distance image can be also attained by applying the filtering shown in expression (6) to the entire image and calculating the related expression relating to the observed quantity and the distance up to the object for each respective image element in accordance with expression (14) and expression (3) or by calculating the distance data by referring to the look-up-table. The situation in external space can be determined based on this distance image. For example, in the research field of computer vision, extensive research for enabling computers to understand an object as a human being does and for determining the position in relation to the objects has been extensively performed. However, there is a problem in obtaining the distance image in three dimensional space. Thus the positional relation of the objects and the structure in the three dimensional space can not be easily understood. The present invention obtains the distance data and the three dimensional environment with ease and thus enables such an environment to be understood. The present invention derives the distance image with a high rate of speed such as at a video rate. A special solution of the distance image is about its distribution.

The basic principle of the present invention resides in measuring distance based on two images through a filtering process. The filtering process limits the degree of the distribution of the image by determining the filter size to be σ. Accordingly, the sigma affects on the obtained distance image data and the accuracy of the distance image data depends on the distribution σ. In other words, the actual distance differs from the distance obtained according to the present invention by the distribution σ in terms of accuracy. When the method of the present invention is compared with the sensitivity of the vision of the human beings, human being cannot measure the distance with high accuracy, but understand the environment of the works better than does the present method. Therefore, the present invention achieves a sufficient accuracy, as the distance measured by the present method differs from the actual distance nearly by the distribution σ.

In the above description, the television camera is moved on the same optical axis. Instead of moving the television camera, the lens or the image receiving plane within the television camera may be moved on the same optical axis or a plurality of moving planes are positioned on different points within the television camera, thereby calculating the distance data using the same process as described above.

Figure 7:
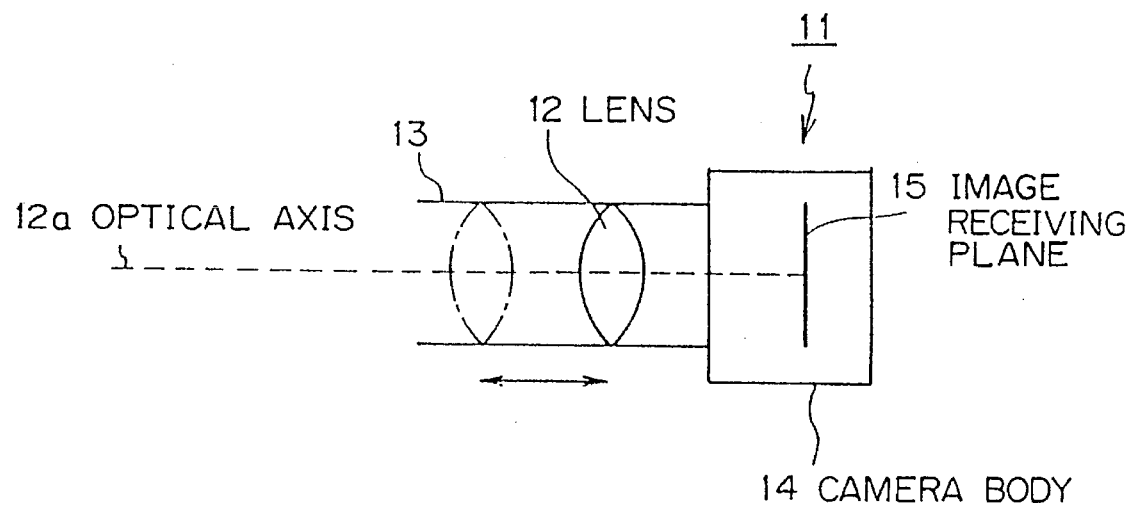
FIG. 7 shows a diagram of the first example of an image input unit of the distance measuring apparatus according to the present invention.

FIG. 7 shows a schematic configuration of a first example of the image input unit 6 of the distance measuring apparatus shown in FIG. 4.

In FIG. 7, the image input unit 11 is provided with a lens moving structure for sliding the lens 12 provided in the lens cylinder 13 along the optical axis 12a of the lens 12 within the lens cylinder 13 and for changing the distance between the image receiving plane 15 provided by the lens 12 and the image receiving plane 15 provided in the camera body 14.

By controlling the lens moving structure, respective observed images Is and Is' with different blurs can be obtained on the image receiving plane 15 by moving the lens from its position shown by the solid line to the position shown by a dashed line. Two observed images are input to the calculation processing unit 3 not shown. The previously described series of processes is carried out by the calculation processing unit 3, thereby enabling the distance data to be obtained with ease by using monocular.

Figure 8:
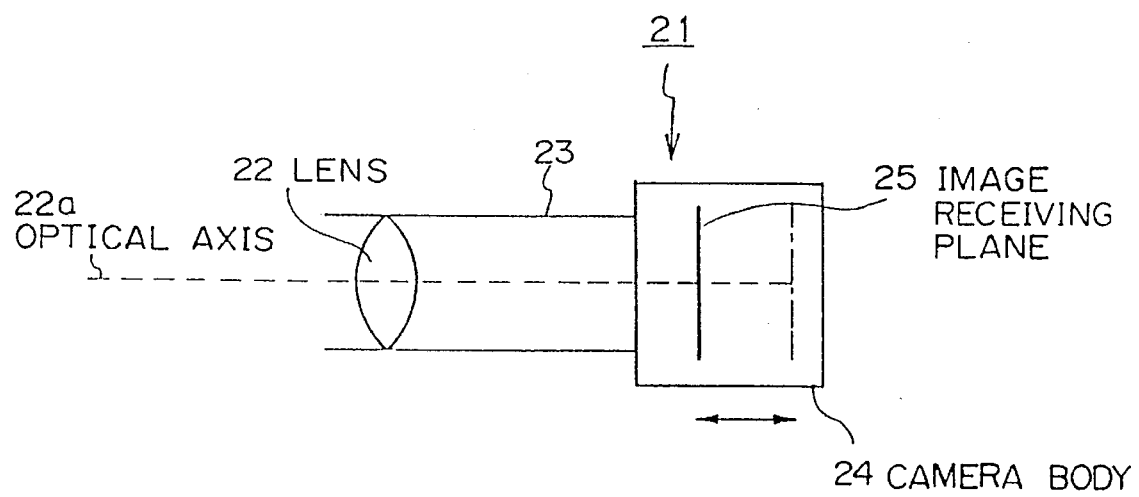
FIG. 8 shows a diagram of the second example of the image input unit of the distance measuring apparatus according to the present invention.

FIG. 8 shows the distance measuring apparatus shown in FIG. 4 according to the present invention and designates a schematic drawing of a structure of the second example of the image input unit 6.

As shown in FIG. 8, the image input unit 21 is provided with a moving structure for the image receiving plane for moving the image receiving plane 25 provided in the camera body 24 along an optical axis 22a of the lens 22 provided in the lens cylinder 23 in the camera body 24, thereby changing the distance between the image receiving plane 25 and lens 22.

By controlling the image receiving plane movement structure, respective observed images Is and Is' with different blurs are obtained on the image receiving plane 25 with regard to a position shown by a solid line before the image receiving plane 25 is moved and a position shown by a dashed line after the image receiving plane 25 is moved. These two observed images are input to the calculation processing unit 3 not shown and the above described process is carried out by the calculation processing unit 3, thereby enabling the distance data to be obtained using monocular with ease.

Figure 9:
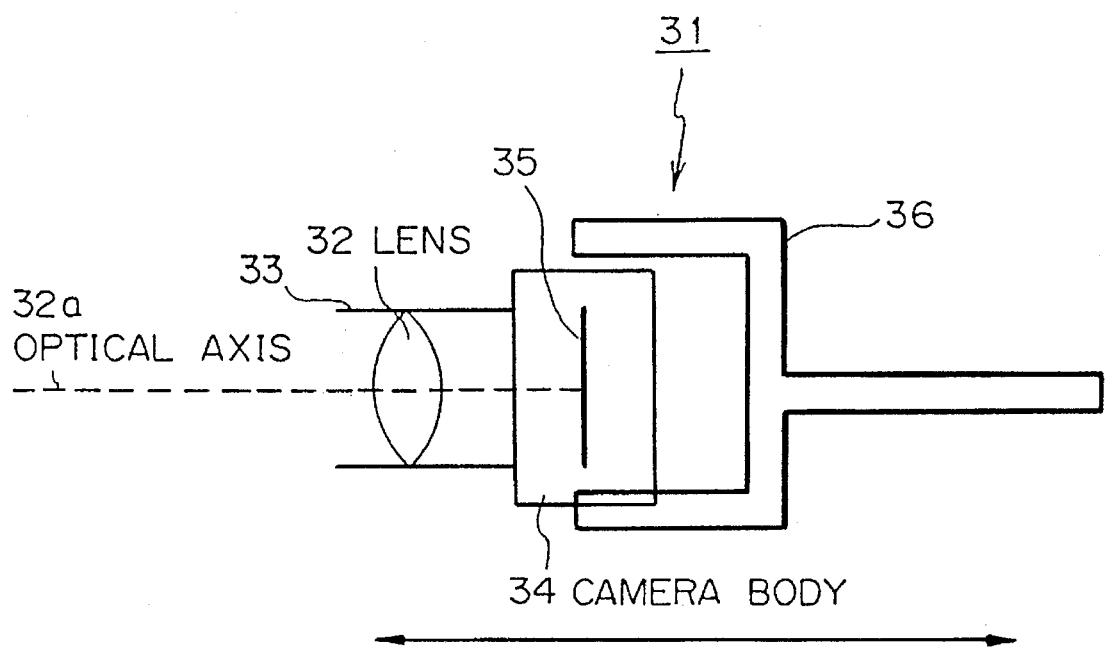
FIG. 9 shows the third example of the image input unit of the distance measuring apparatus according to the present invention.

FIG. 9 shows the distance measuring apparatus shown in FIG. 4 and a schematic diagram of a structure of the third example of the image input unit 6.

As shown in FIG. 9, the image input unit 31 is provided with a structure 36 to move the camera body. This fixes the distance between the image receiving plane 35 provided in the camera body 34 and the lens 32 provided in the lens cylinder 33 and moves the camera body 34 along an optical axis 32a of the lens 32.

By controlling the moving structure 36 for the camera body, respective observed images Is and Is' with different blurs are obtained on the image receiving plane 35 relative to the position before the camera body is moved and the position after the camera body 34 is moved. These two observed images are input to the calculation processing unit 3 not shown and the above described process is carried out, thereby enabling the distance data to be obtained with ease using monocular.

Figure 10:
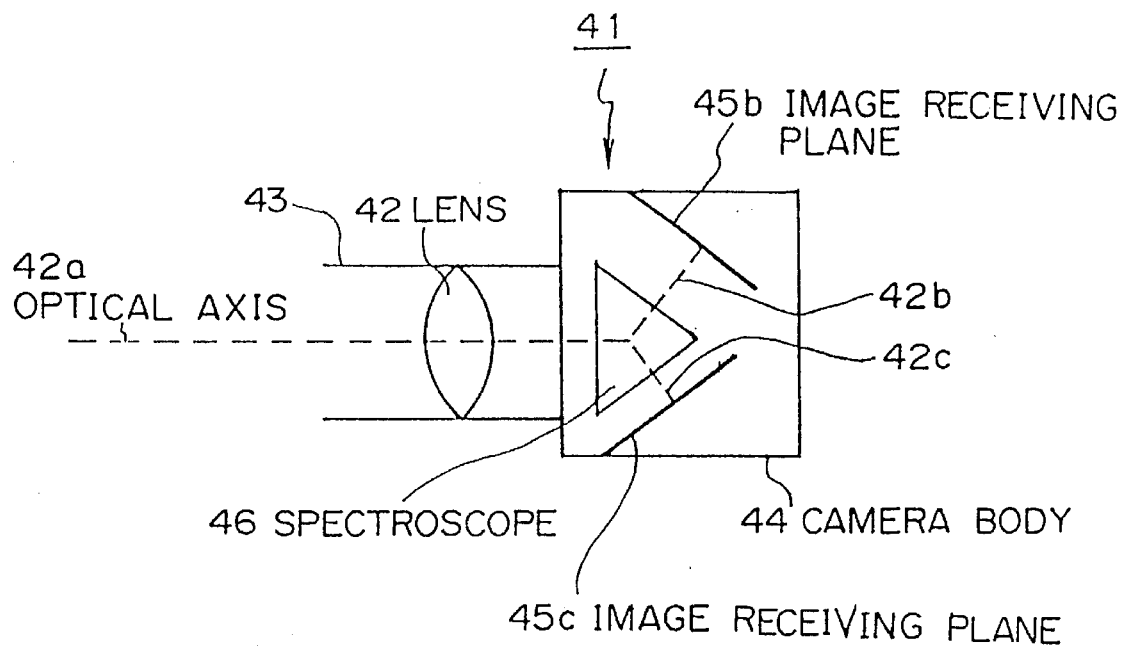
FIG. 10 shows the forth example of the image input unit of the distance measuring apparatus according to the present invention.

FIG. 10 shows a schematic diagram of a structure of the fourth example of the image input unit 6 in the distance measuring apparatus shown in FIG. 4.

As shown in FIG. 10, the image input unit 41 is provided with a spectroscope 46 such as a prism and respective image receiving plane 45b and 45c are provided positions with different distances from the spectroscope within the camera body 44 and the optical axis 42a of the lens 42 provided in the lens cylinder 43 is divided into two optical axes 42b and 42c by the spectroscope 46.

Neither moving the lens 42 in the lens cylinder 43 nor moving the image receiving planes 45b and 45c in the camera body 44 are necessary. Further, moving the camera body 44 is not necessary. The lens 42 and the image receiving planes 44b and 44c are in fixed positions and the distance between the spectroscope 46 and two image receiving planes 45b and 45c are made different and respective observed images Is and Is' with different blurs are obtained on the respective image receiving planes 45b and 45c. These two observed images are input to the calculation processing unit 3 not shown and the above described process is carried out, thereby enabling the distance data to be obtained with ease using a single eye sight. Further, in this embodiment, moving structures such as a lens and image receiving plane are not needed. Thus in the present example, the two observed images are simultaneously obtained by using the same optical system. Thus the deterioration of accuracy which is caused movement structures can be prevented.

The method of moving the lens, image receiving plane and the camera body along an optical axis without changing the focus distance f of the lens and the radius Γ of the lens satisfies the principle expression (3) in which either the distance a between the lens and the object, or the distance f between the lens and the image receiving plane, or both, are changed. Accordingly, the object measuring method of the present invention can be applied in respective cases where the lens of the camera is moved, the image receiving plane is moved in the camera body, the entire camera is moved and a plurality of image receiving planes are provided in different position in the camera body. If the method satisfies the principle expression (3), then the method also satisfies expression (14). Thus, the distance measuring method of the present invention can be applied to the respective methods of movement.

Figure 11:
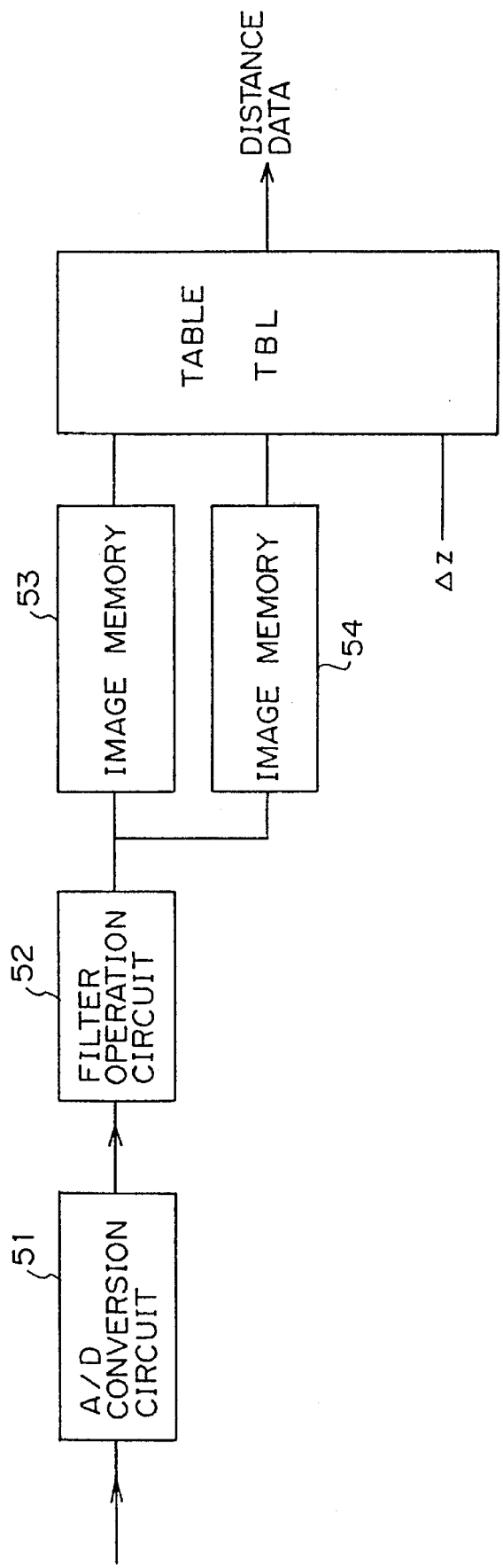
FIG. 11 shows a block diagram of the third embodiment of the distance measuring apparatus for processing two images obtained at different points in time.

FIG. 11 shows a block diagram of the third embodiment of the distance measuring apparatus according to the present invention in which an operation of taking an image is performed twice. The image input unit in this embodiment uses the structures shown in FIGS. 7, 8 and 9.

The analog image taken at the first point in time is converted to a digital signal by the A/D conversion circuit 51. The digital image is input to the filter operation circuit 52 and the result Fs is stored in the image memory 53.

Sequentially, after the movement of the camera, lens, or image receiving plane is conducted by Δz, the analog image taken at the point in second time is converted to the digital image by the A/D converter 51 and then the result is input to the filter operation circuit 52, thereby-providing Fs'. The result Fs' is stored in the image memory 54. The Fs and Fs' obtained by these sequential operations and the movement distance Δz are input to the table TBL, thereby providing the distance data from the table TBL.

Figure 12:
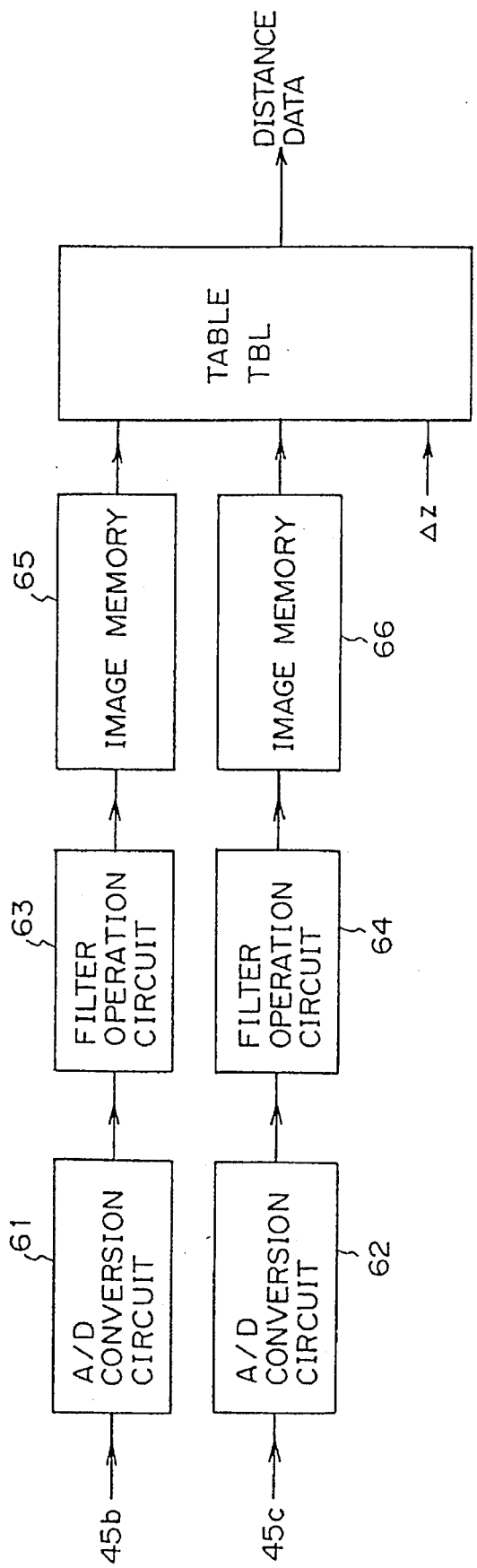
FIG. 12 shows the fourth example of the distance measuring apparatus for receiving two image data at a single point in time period.

FIG. 12 shows the fourth embodiment of the distance measuring apparatus according to the present invention in which the images are received and processed simultaneously at a single point in time. In the third embodiment, the movement by the distance Δz is required but in the fourth embodiment two analog images obtained by two image receiving planes 45b and 45c as shown in FIG. 10 are received and processed at a single point in time, thereby providing the distance.

The analog images obtained from two image receiving planes 45b and 45c are input to the A/D conversion circuits 61 and 62. The digital image converted to the digital data by the A/D conversion circuits 61 and 62 are input to the filter operation circuits 63 and 64, thereby providing Fs and Fs'. These results are stored in the image memory 65 and 66 to provide an address of the table TBL. In this structure, Δz is fixed in the above operation, and the analog image of the image receiving planes which are different by a distance Δz can be taken at the single point in time. The A/D conversion operation and the filtering operation can be also simultaneously performed with regard to the two images, thereby providing the distance in half the time required for the third embodiment.

What is claimed is:

1. A method of obtaining distance data from an object to a lens based on an image of the object obtained by an image input unit which forms an image of the object through the lens on an image receiving plane, comprising the steps of:

providing a single image input unit, including a lens and an image receiving plane, obtaining two images Is and Is' of an object by forming the two images Is and Is' through the lens on the image receiving plane;

obtaining the two images Is and Is' having two different first and second blurs, respectively, using said single image input unit, by setting at least one of a position of the lens and a position of the image receiving plane in relation to the object different for each of said two images Is and Is' by a minute distance Δz on an optical axis common to said two images Is and Is';

performing filtering processes by applying a filter to each of said two images Is and Is', thereby generating two output images Fs and Fs'; and calculating a distance a from the lens to the object based on said generated two output images Fs and Fs' according to a relation between said generated two output images Fs and Fs' and a radius s of the first blur and a radius s' of the second blur on the image receiving plane for the object at the distance a from the lens and a relation between the radius s of the first blur and a radius s' of the second blur and the distance a from the lens to the object.

2. The method of measuring the distance according to claim 1 further comprising:

the step of designating said filtering processes by the following expressions (A) and (B)

$$Fs = \int \exp(-x^2/\sigma^2) \exp(ikx) Is(x) dx \quad (A)$$

$$Fs' = \int \exp(-x^2/\sigma^2) \exp(ikx) Is'(x) dx \quad (B)$$

where k represents a predetermined spatial frequency in a Gaussian spatial filtering process, σ represents a distribution of the Gaussian spatial filtering process, and x represents a coordinate in a direction of the x axis, the step of representing a relation between the generated two output images Fs and Fs' and the radius of s of the first blur by the following expression (C)

$$\frac{(Fs' - Fs)}{(\Delta z) Fs} = \left( \frac{ks \cos(ks) - \sin(ks)}{\sin(ks)} \right) \left( \frac{s}{f\Gamma} \right) \quad (C)$$

and the step of representing a relation between the radius s of the first blur and the distance a from the lens to the object by the following expression (D)

$$s = \frac{\Gamma f}{a} \quad (D)$$

where Γ represents a radius of the lens and f a focus distance of the lens.

3. The method of measuring the distance according to claim 1 wherein the calculating step further includes the step of calculating the distance a from the lens to the object by referring to a look-up-table which is previously prepared to represent a relation between a calculation value of said expression (C) and the distance a from the lens to the object.

4. A distance measuring apparatus comprising:

a single image input unit including a lens and an image receiving plane, obtaining two observed images of an object on the image receiving plane and outputting the two observed images;

first operation means for receiving a first image of said two observed images from said single image input unit and for applying a filtering process to the first image input from said single image input unit by performing a Fourier transformation for a respective predetermined frequency k;

second operation means for receiving a second image of said two observed images from said single image input unit and for applying said filtering process of said first operation means to the second image input from the single image input unit if at least one of a lens position, a position of the image receiving plane, and a position of the single image input unit is moved from a position of said first image; and third operation means for obtaining a distance from the lens to the object based on a result of the first operation means for the first image, a result of the second operation means for the second image and a distance in which said at least one of the lens, the image receiving plane and the single image input unit are moved.

5. The distance measuring apparatus according to claim 4, wherein the first and second operation means include means for performing an integration of a result obtained by multiplying the two observed images input from said single image input unit by a Gaussian function and a Fourier function.

6. The distance measuring apparatus according to claim 5, wherein said third operation means includes means for obtaining the distance from the lens to the object from the following expressions $$\frac{\frac{(Fs' - Fs)}{(\Delta z) Fs} = \left( \frac{ks \cos(ks) - \sin(ks)}{\sin(ks)} \right) \left( \frac{s}{f\Gamma} \right)}{s = \frac{\Gamma f}{a}} \quad (D)$$

wherein Fs represents a result of the first operation means, Fs' represents a result of the second operation means, Δz is the quantity of the movement representing the distance in which said at least one of the lens, the image receiving plane and the single image input unit are moved, k is a predetermined spatial frequency in a Gaussian spatial filtering process, Γ is a radius of the lens, f is a focus distance of the lens, s is a radius blur of one of the two observed images, and a is the distance from the lens to the object.

7. The distance measuring apparatus according to claim 5, further comprising memory means for storing a look-up-table previously prepared for a result of the first operation means, a result of the second operation means and the distance from the lens to the object, wherein said third operation means obtains the distance from the lens to the object by referring to said look-up-table.

8. The distance measuring apparatus according to claim 7 further comprising means for obtaining said look-up-table by performing a calculation of data associated with the result of the first operation means and the result of the second operation means obtained for the quantity of the movement.

9. The distance measuring apparatus according to claim 4, wherein said single image input unit comprises a lens movement structure moving the lens along an optical axis and outputting the first and second images obtained on the image receiving plane before the lens is moved and after the lens is moved, respectively.

10. The distance measuring apparatus according to claim 4, wherein said single image input unit comprises an image receiving plane structure moving the image receiving plane along an optical axis and outputting the first and second images on the image receiving plane before the image receiving plane is moved and after the image receiving plane is moved, respectively.

11. The distance measuring apparatus according to claim 4, wherein said single image input unit comprises a structure moving a camera body along an optical axis keeping positions of the lens and the image receiving plane fixed and outputting the first and second images on the image receiving plane before the camera body is moved and after the camera body is moved, respectively.

12. The distance measuring apparatus according to claim 4, wherein said single image input unit includes a spectroscope and respective image receiving planes with different distances from the spectroscope, and outputs the first and second images at the respective image receiving plane.

* * * * *

UNITED STATES PATENT AND TRADEMARK OFFICE
CERTIFICATE OF CORRECTION

PATENT NO. : 5,576,975        Page 1 of 3
DATED       : November 19, 1996
INVENTOR(S) : Shigeru SASAKI et al.

It is certified that error appears in the above-indentified patent and that said Letters Patent is hereby corrected as shown below:

Title page:
Item 73, change "Kanagawa" to --Kawasaki--.

Col. 1, line 15, change "a" (second occurrence) to --an--;
        line 35, after "instantaneously" insert --and--; and
        line 50, after "cameras" insert --,--.

Col. 2, line 6, after "edge" insert --,--.

Col. 4, line 32, equation (8) should read:

$$\int \exp(-x^2/\sigma^2)\exp(ikx)p(x-x')dx$$
$$= (1/2s)\int_{x'-s}^{x'+s} \exp(-x^2/\sigma^2)\exp(ikx)dx \quad \sigma \gg s$$
$$\fallingdotseq (1/2s)\exp(-x'^2/\sigma^2)\int_{x'-s}^{x'+s}\exp(ikx)dx$$
$$= (1/2s)\exp(-x'^2/\sigma^2)2\sin(ks)\exp(ikx')/k$$
$$= (\sin(ks)/ks)\exp(-x'^2/\sigma^2)\exp(ikx') \quad \ldots \quad (8)$$

line 46, change "$\Delta Z$" to --$\Delta z$--;

Col. 4, line 57, equation (12) should read:

$$(Fs'-Fs)/Fs = \frac{\sin(ks')/ks' - \sin(ks)/ks}{\sin(ks)/ks}$$

UNITED STATES PATENT AND TRADEMARK OFFICE
CERTIFICATE OF CORRECTION

PATENT NO. : 5,576,975   Page 2 of 3
DATED : November 19, 1996
INVENTOR(S) : Shigeru SASAKI et al.

It is certified that error appears in the above-indentified patent and that said Letters Patent is hereby corrected as shown below:

Col. 6,  line 19, after "lens" insert --,--;
         line 23, change "expression" to --expressions--;
         line 27, delete "able to deal" and insert
           --deals--.

Col. 7,  line 43, delete "it obtains"; and
         line 61, change "substitute" to --substitutes--.

Col. 9,  line 11, change "provide" to --provides--;
         line 56, after "input" insert --by--; and
         line 58, after "vision" insert --,--.

Col. 10, line 14, after "speed" insert --,--; and
         line 28, change "being" to --beings--.

Col. 12, line 21, change "thereby-providing" to --thereby
         providing--.

Col. 13, line 11, after "1" insert --,--;
         line 27, equation (c) should read:

$$\frac{(Fs'-Fs)}{(\Delta_z)Fs} = (\frac{ks\cos(ks)-\sin(ks)}{(\sin(ks))})(\frac{s}{F\overline{T}})$$

line 38, after "1 insert --,--.

UNITED STATES PATENT AND TRADEMARK OFFICE
CERTIFICATE OF CORRECTION

PATENT NO. : 5,576,975
DATED : November 19, 1996
INVENTOR(S) : Shigeru SASAKI et al.

It is certified that error appears in the above-indentified patent and that said Letters Patent is hereby corrected as shown below:

Col. 14, line 14, equation (D) should be two separate equations to read:

$$\frac{(Fs'-Fs)}{(\Delta z)Fs} = \left(\frac{ks\cos(ks)-\sin(ks)}{\sin(ks)}\right)\left(\frac{s}{f\Gamma}\right) \quad (C)$$

$$s=\frac{rf}{a} \quad (D)$$

line 35, after "7" insert --,--.

Signed and Sealed this

Ninth Day of December, 1997

Attest:

BRUCE LEHMAN

Attesting Officer

Commissioner of Patents and Trademarks